ESHLEMAN.
Cultivator.
No. 109,812. Patented Dec. 6, 1870.
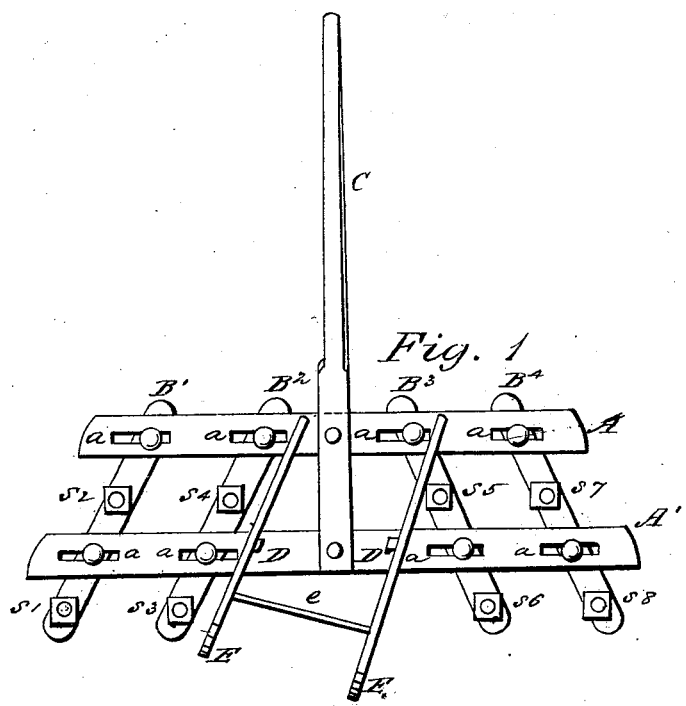
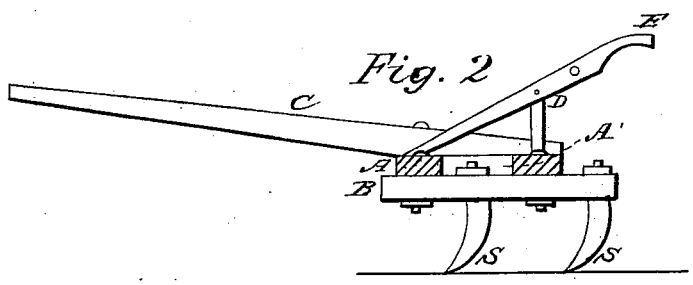
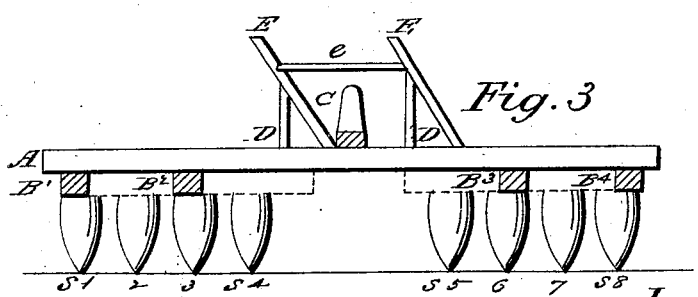
Witnesses:
W. B. Wiley
Jacob Stauffer
Inventor:
Abraham Eshleman

UNITED STATES PATENT OFFICE.

ABRAHAM ESHLEMAN, OF MARTINSVILLE, PENNSYLVANIA.

IMPROVEMENT IN CULTIVATORS.

Specification forming part of Letters Patent No. 109,812, dated December 6, 1870.

*To all whom it may concern:*

Be it known that I, ABRAHAM ESHLEMAN, of Martinsville, in the county of Lancaster and State of Pennsylvania, have invented certain Improvements on Cultivators, of which the following is a specification.

The object of my invention is to arrange the shovels for working two rows of corn in one round, and at the same time to bring the two series of shovels in close proximity, the better to adapt the machine to the inequalities or undulations of the soil, and yet in such a position as to be intermediate, by means of two pairs of shovel-beams parallel to each other, both pairs inclined inward in front, as shown in the accompanying drawings.

Figure 1 is a top or plan view of the arrangement of the parts. Fig. 2 is a side elevation to show the close proximity of the two series of shovels. Fig. 3 is a rear view of the position of the shovels in a cross-line when straddling a row of corn.

A brief explanation will enable any one skilled in the art to make and use the same.

A A' are two cross-beams, parallel to each other, which have oblong slots $a$, and are centrally connected to the tongue or pole C; E, the handle; D, the upright handle-supports. Beneath these slotted beams A are the short shovel-beams B' B² on one side of the handle and inclined outward in the rear; B³ and B⁴ in like manner on the other side, forming two pairs, each pair of beams parallel and made adjustable in the slotted cross-beams A by means of headed binding screw-bolts of any approved construction. The inclined shovel-beams B for the shovels S are easily adjusted to any desired angle, and admirably adapted for scoring out or dressing corn—that is, action between the rows of corn on both sides—and yet bring the two series of shovels so closely together as to conform to the ridges, furrows, or undulations so apt to throw out or prevent the proper action of all the shovels when extended forward in a triangular form. I am aware, however, of transverse beams carrying teeth adjustable laterally in slots, said beams also attached to the tongue. These constitute the shovel-beams and are also parallel to each other. Such an arrangement (which is only adapted for working the soil on one side of the row) I do not claim. My parallel shovel-beams are separate, each with two shovels, as shown. The beams B are made adjustable with the shovels on the transverse beams A, thereby affording a variety of changes in their relative positions.

What I claim as my invention, and desire to secure by Letters Patent, is—

The arrangement of two sets of shovels, S, adjustable oblique beams B, and cross-beams A A, when constructed and operating as herein described, and for the purposes set forth.

ABRAHAM ESHLEMAN.

Witnesses:
WM. B. WILEY,
JACOB STAUFFER.